(12) United States Patent
Bitran et al.

(10) Patent No.: US 8,259,823 B2
(45) Date of Patent: Sep. 4, 2012

(54) ENERGY-EFFICIENT UPLINK SLOT ALLOCATION IN TIME-FREQUENCY DIVISION MULTIPLE ACCESS SYSTEMS

(75) Inventors: Yigal Bitran, Ramat HaSharon (IL); Noah Semel, Kfar Saba (IL)

(73) Assignee: Altair Semiconductor Ltd., Hod Hasharon (IL)

( * ) Notice: Subject to any disclaimer, the term of this patent is extended or adjusted under 35 U.S.C. 154(b) by 1467 days.

(21) Appl. No.: 11/638,266

(22) Filed: Dec. 12, 2006

(65) Prior Publication Data
US 2008/0025422 A1    Jan. 31, 2008

Related U.S. Application Data

(60) Provisional application No. 60/820,523, filed on Jul. 27, 2006.

(51) Int. Cl.
H04L 27/28  (2006.01)
H04L 27/26  (2006.01)

(52) U.S. Cl. .............................. 375/260; 375/295
(58) Field of Classification Search .............. 375/260, 375/259, 295, 316, 358; 370/335, 478, 330, 370/203, 208, 210; 455/509, 67.13
See application file for complete search history.

(56) References Cited

U.S. PATENT DOCUMENTS

| | | | |
|---|---|---|---|
| 6,169,723 B1 | 1/2001 | Fertner et al. | |
| 7,016,651 B1 | 3/2006 | Narasimhan | |
| 7,072,315 B1 | 7/2006 | Liu et al. | |
| 7,133,646 B1 | 11/2006 | Miao | |
| 7,133,669 B2 | 11/2006 | Nair et al. | |
| 7,363,051 B2 | 4/2008 | Bridgelall | |
| 7,372,896 B2 | 5/2008 | Bjerke et al. | |
| 7,406,296 B2 | 7/2008 | Haartsen et al. | |
| 7,418,035 B1 | 8/2008 | Clark | |
| 7,570,953 B2 * | 8/2009 | Maltsev et al. | 455/450 |
| 7,586,990 B2 | 9/2009 | Subramanian et al. | |
| 7,609,772 B2 | 10/2009 | Yu et al. | |
| 7,684,379 B2 | 3/2010 | Kim et al. | |
| 7,706,248 B2 | 4/2010 | Sondur et al. | |
| 7,711,386 B2 * | 5/2010 | Sung et al. | 455/522 |
| 7,720,181 B2 | 5/2010 | Park et al. | |
| 7,912,118 B2 | 3/2011 | Wang et al. | |
| 2002/0136233 A1 | 9/2002 | Chen et al. | |
| 2002/0181390 A1 | 12/2002 | Mody et al. | |
| 2002/0181509 A1 | 12/2002 | Mody et al. | |
| 2003/0054788 A1 | 3/2003 | Sugar et al. | |
| 2003/0169824 A1 | 9/2003 | Chayat | |
| 2004/0029619 A1 | 2/2004 | Liang et al. | |

(Continued)

OTHER PUBLICATIONS

International Application No. PCT/IL2007/000008 Search report dated Sep. 11, 2008.

(Continued)

*Primary Examiner* — Tesfaldet Bocure
(74) *Attorney, Agent, or Firm* — D. Kliger I.P. Services Ltd.

(57) ABSTRACT

A method for communication includes accepting a request from a transmitter to transmit data to a receiver in a multiple-access communication system that uses multiple subcarriers. A maximum number of the subcarriers on which the transmitter may transmit the data simultaneously without violating a predetermined signal power criterion is calculated. The transmitter is allocated a time-frequency allocation containing the maximum number of the subcarriers. The data is transmitted from the transmitter to the receiver using the allocated time-frequency allocation.

24 Claims, 2 Drawing Sheets

U.S. PATENT DOCUMENTS

| | | | |
|---|---|---|---|
| 2004/0162106 A1 | 8/2004 | Monroe et al. | |
| 2005/0020295 A1* | 1/2005 | Attar et al. | 455/522 |
| 2005/0020299 A1 | 1/2005 | Malone et al. | |
| 2005/0025093 A1 | 2/2005 | Yun et al. | |
| 2005/0059347 A1 | 3/2005 | Haartsen | |
| 2005/0099937 A1* | 5/2005 | Oh et al. | 370/207 |
| 2005/0105589 A1* | 5/2005 | Sung et al. | 375/130 |
| 2005/0163238 A1* | 7/2005 | Fujii | 375/260 |
| 2005/0195786 A1 | 9/2005 | Shpak | |
| 2006/0176093 A1* | 8/2006 | Song et al. | 327/179 |
| 2006/0198476 A1 | 9/2006 | Palaskas et al. | |
| 2006/0221917 A1 | 10/2006 | McRae | |
| 2007/0076649 A1 | 4/2007 | Lin et al. | |
| 2007/0104145 A1 | 5/2007 | Jan | |
| 2007/0110003 A1 | 5/2007 | Tujkovic et al. | |
| 2007/0121751 A1 | 5/2007 | Li et al. | |
| 2007/0124478 A1 | 5/2007 | Abdelhamid et al. | |
| 2007/0127563 A1* | 6/2007 | Wu et al. | 375/229 |
| 2007/0140256 A1 | 6/2007 | Yaqub | |
| 2007/0153834 A1 | 7/2007 | Qu et al. | |
| 2007/0165564 A1* | 7/2007 | Lee et al. | 370/329 |
| 2007/0183383 A1 | 8/2007 | Bitran et al. | |
| 2007/0184798 A1 | 8/2007 | Bitran et al. | |
| 2007/0184835 A1 | 8/2007 | Bitran et al. | |
| 2007/0275746 A1 | 11/2007 | Bitran | |
| 2008/0298316 A1 | 12/2008 | Bitran et al. | |
| 2009/0040975 A1 | 2/2009 | Vijayan et al. | |

OTHER PUBLICATIONS

International Application No. PCT/IL2007/000899 Search report dated Apr. 21, 2008.

Klang et al., "Identification of Radio-Link Technologies", Deliverable D2.1 of the Wireless World Initiative—New Radio (Winner), ISR-2003-507581, version 1.0, Jul. 1, 2004.

U.S. Appl. No. 11/647,122 Official Action dated Sep. 15, 2008.

U.S. Appl. No. 11/638,629 Official Action dated Sep. 29, 2008.

U.S. Appl. No. 11/638,267 Official Action dated Oct. 6, 2008.

U.S. Appl. No. 11/638,265 Official Action dated Oct. 7, 2008.

International Application PCT/IL2007/000147 Search Report dated Sep. 12, 2008.

Chinese Patent Application # 200780004782.4 Official Action dated Jul. 13, 2011.

Gesbert, et al., 2003. "From Theory to Practice: An Overview of MIMO Space-Time Coded Wireless Systems". IEEE Journal on Selected Areas in Communications 21(3): 281-302.

U.S. Appl. No. 60/772,101, filed Feb. 9, 2006.

U.S. Appl. No. 60/820,523, filed Jul. 27, 2006.

http://www.wimaxforum.org/16, Aug. 9, 2007.

http://www.ieee802.org/16, 2006.

"IEEE Standard for Local and Metropolitan Area Networks—Part 16: Air Interface for Fixed and Mobile Broadband Wireless Access Systems—Amendment 2: Physical and Medium Access Control Layers for Combined Fixed and Mobile Operation in Licensed Bands and Corrigendum 1," 2006. Sections 8.4.4.5, 8.4.5.4, 8.4.5.4.1, and 8.4.5.4.2.

U.S. Appl. No. 12/096,220 Official Action dated Mar. 3, 2011.

Japanese Patent Application # 2008-553884 Official Action dated Mar. 21, 2012.

* cited by examiner

ENERGY-EFFICIENT UPLINK SLOT ALLOCATION IN TIME-FREQUENCY DIVISION MULTIPLE ACCESS SYSTEMS

CROSS-REFERENCE TO RELATED APPLICATIONS

This application claims the benefit of U.S. Provisional Patent Application 60/820,523, filed Jul. 27, 2006, which is incorporated herein by reference.

FIELD OF THE INVENTION

The present invention relates generally to communication systems, and particularly to methods and systems for assigning transmission slots in time-frequency division multiple access systems.

BACKGROUND OF THE INVENTION

Several communication systems and applications use time-frequency division multiple access for allocating time and frequency resources among multiple communication terminals. Such multiple access methods typically divide the time and frequency domains into discrete segments, and allocate the segments to communication terminals for transmitting data. One type of time-frequency division multiple access scheme is orthogonal frequency division multiple access (OFDMA), which is used, for example, in communication systems based on the IEEE 802.16 family of standards, commonly referred to as WiMAX. Information regarding these standards is available at www.ieee802.org/16 and at www.wimaxforum.org.

Mobile WiMAX applications often conform to the IEEE 802.16e-2005 standard, entitled "IEEE Standard for Local and Metropolitan Area Networks—Part 16: Air Interface for Fixed and Mobile Broadband Wireless Access Systems—Amendment 2: Physical and Medium Access Control Layers for Combined Fixed and Mobile Operation in Licensed Bands and Corrigendum 1," which is incorporated herein by reference. Sections 8.4.4.5, 8.4.5.4, 8.4.5.4.1 and 8.4.5.4.2 of the standard describe uplink resource allocation.

SUMMARY OF THE INVENTION

There is therefore provided, in accordance with an embodiment of the present invention, a method for communication, including:

accepting, a request from a transmitter to transmit data to a receiver in a multiple-access communication system that uses multiple subcarriers;

calculating a maximum number of the subcarriers on which the transmitter may transmit the data simultaneously without violating a predetermined signal power criterion;

allocating to the transmitter a time-frequency allocation containing the maximum number of the subcarriers; and transmitting the data from the transmitter to the receiver using the allocated time-frequency allocation.

In some embodiments, the communication system includes an orthogonal frequency division multiple access (OFDMA) system. In a disclosed embodiment, the communication system conforms to an IEEE 802.16e standard, the transmitter includes a mobile station (MS) and the receiver includes a base station (BS). Allocating the time-frequency allocation may include allocating the time-frequency allocation when the BS and MS operate in at least one uplink mode selected from a group of modes consisting of a Partially-Used Sub-Channeling (PUSC) mode, an Optional PUSC mode, an Adaptive Modulation and Coding (AMC) mode, an Adaptive Antenna System (AAS) mode, a Hybrid Automatic Repeat Request (HARQ) mode and a Space-Time Coding (STC) mode.

In another embodiment, accepting the request includes accepting a request to transmit a predetermined volume of the data, and allocating the time-frequency allocation includes determining a time duration of the allocation responsively to the volume of the data and to the maximum number of the subcarriers.

In yet another embodiment, the method includes determining whether to allocate the time-frequency allocation containing the maximum number of the subcarriers based on a predetermined policy. The predetermined policy may be based on at least one parameter selected from a group of parameters consisting of:

an expected transmission power of the transmitter;

a headroom between the expected transmission power and a maximum power of the transmitter;

a mobility of the transmitter;

a characteristic of the communication channel between the transmitter and the receiver; and another time-frequency allocation to another transmitter.

In still another embodiment, calculating the maximum number of the subcarriers includes maximizing the number of the subcarriers in the allocation while not exceeding a maximum power rating of the transmitter.

In some embodiments, allocating the time-frequency allocation includes protecting the allocation from other allocations. In an embodiment, the communication system conforms to an IEEE 802.16e standard, and protecting the allocation includes assigning an Uplink Interval Usage Code value of thirteen (UIUC=13) to the allocation.

There is additionally provided, in accordance with an embodiment of the present invention, a base station in a multiple access communication system that uses multiple subcarriers, including:

a receiver, which is arranged to accept a request to transmit data from a user terminal of the communication system; and a processor, which is arranged to calculate a maximum number of the subcarriers on which the user terminal may transmit the data simultaneously without violating a predetermined signal power criterion, and to allocate a time-frequency allocation containing the maximum number of the subcarriers to the user terminal, so as to enable the user terminal to transmit the data in the allocated time-frequency allocation.

There is also provided, in accordance with an embodiment of the present invention, a computer software product for communication in a base station of a multiple access communication system that uses multiple subcarriers, the product including a computer-readable medium, in which program instructions are stored, which instructions, when read by a computer, cause the computer to accept a request to transmit data from a user terminal of the communication system, to calculate a maximum number of the subcarriers on which the user terminal may transmit the data simultaneously without violating a predetermined signal power criterion, and to allocate a time-frequency allocation containing the maximum number of the subcarriers to the user terminal, so as to enable the user terminal to transmit the data in the allocated time-frequency allocation.

There is further provided, in accordance with an embodiment of the present invention, a multiple access communication system that uses multiple subcarriers, including:

a transmitter, which is arranged to submit a request to transmit data and to transmit the data in a time-frequency allocation allocated to the transmitter responsively to the request; and a receiver, which is arranged to accept the request, to calculate a maximum number of the subcarriers on which the transmitter may transmit the data simultaneously without violating a predetermined signal power criterion, and to allocate the time-frequency allocation containing the maximum number of the subcarriers to the transmitter.

The present invention will be more fully understood from the following detailed description of the embodiments thereof, taken together with the drawings in which:

DETAILED DESCRIPTION OF EMBODIMENTS

Overview

Figure 1:
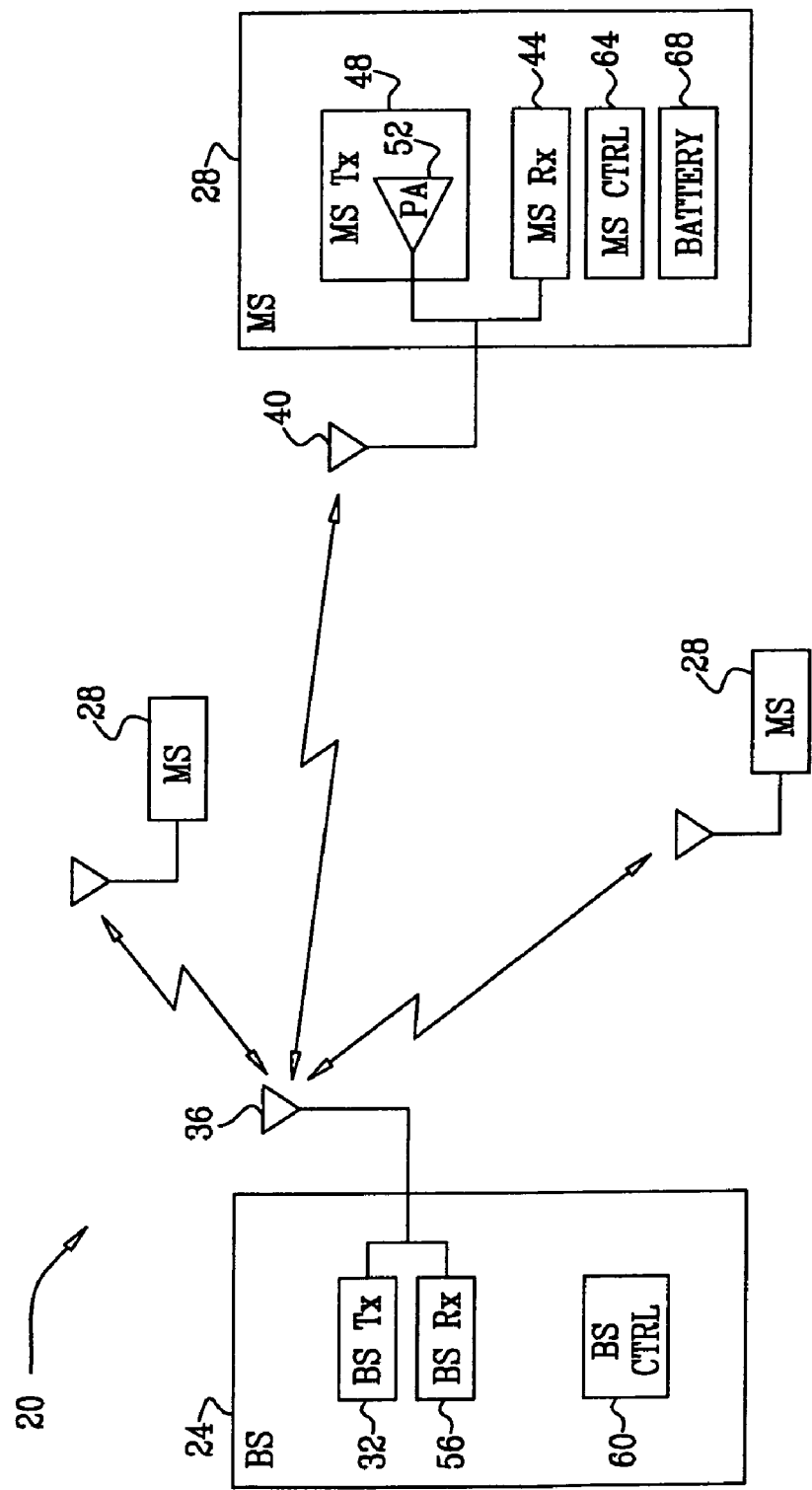
FIG. 1 is a block diagram that schematically illustrates an OFDMA communication system, in accordance with an embodiment of the present invention.

In many communication systems, minimizing the energy drawn from the power sources of user terminals is a prime consideration. Energy efficiency is particularly important in mobile applications, in which the user terminal is powered by a battery having limited size and capacity.

In OFDMA systems, when a user terminal, such as a mobile station (MS), submits a request to transmit data to a base station (BS), the BS dynamically allocates appropriate time-frequency uplink resources for transmitting the data. Each allocation, referred to herein as a time-frequency allocation, comprises a certain number of OFDMA subcarriers for a certain number of OFDMA symbols. For example, when the uplink operates in a Partially-Used Sub-Channeling (PUSC) mode defined in the IEEE 802.16e systems, the basic allocation unit is a slot, which comprises a single subchannel, which comprises twenty-four subcarriers, for a duration of three OFDMA symbols.

In some cases, the shape of the time-frequency allocation in the time-frequency plane, i.e., the trade-off between time duration and the number of subcarriers, has a significant effect on the energy consumption of the transmitter.

Some known OFDMA systems, however, do not allocate uplink slots in an energy-efficient manner. For example, the IEEE 802.16e standard cited above usually minimizes the number of OFDMA subcarriers allocated to a particular MS. As a result, the time duration of the allocation is increased. The available transmitted power per subcarrier is increased accordingly. However, as will be shown below, such slot allocations are not optimal with regard to the energy consumption of the MS transmitter and its battery life.

Embodiments of the present invention provide improved methods and systems for allocating uplink resources in communication systems that allocate time-frequency slots, such as IEEE 802.16e OFDMA systems. The methods and systems described herein attempt, when possible, to maximize the number of subcarriers and minimize the time duration of the allocation. These embodiments can be used to reduce energy consumption and increase battery life by comparison with allocation methods that are known in the art.

In some embodiments, when a MS submits a request to transmit data to a BS, the BS determines the maximum number of subcarriers on which the MS may transmit simultaneously while still enabling successful reception at the BS. The BS allocates a time-frequency allocation, such as a group of time-frequency slots within the uplink frame, having the determined maximum number of subcarriers. As a result, the time duration of the allocation is reduced, thus minimizing the energy consumed from the MS battery.

The total output power of the MS increases with the number of transmitted subcarriers. Thus, the methods described herein are particularly effective when the MS transmits at low to medium power levels. At these power levels, the MS is typically able to transmit a large number of subcarriers without exceeding the peak power rating of its power amplifier.

The allocation methods described herein can be used in any suitable communication system that allocates time-frequency resources to users. The methods described herein can be implemented in IEEE 802.16e-based OFDMA systems using existing features of the standard. Backward-compatibility with conventional MSs and allocation methods can be maintained, for example by protecting the energy-efficient slot allocations using safety zones.

System Description

FIG. 1 is a block diagram that schematically illustrates an OFDMA communication system 20, in accordance with an embodiment of the present invention. System 20 comprises a base station (BS) 24, which communicates with multiple user terminals, such as mobile stations (MS) 28.

BS 24 transmits downlink data to each MS 28 over a downlink channel, and each MS 28 transmits uplink data to BS 24 over an uplink channel. In the downlink direction, the BS comprises a BS transmitter (BS TX) 32, which modulates the downlink data to produce a radio frequency (RF) signal and transmits the signal via a BS antenna 36. At the MS, the downlink RF signal is received via a MS antenna 40 by a MS receiver (MS RX) 44. The MS RX demodulates the signal and extracts the downlink data.

In the uplink direction, the uplink data of a particular MS 28 is formatted, encoded, modulated, amplified, filtered and/or otherwise processed by a MS transmitter (MS TX) 48. The MS TX produces an RF signal and transmits it via antenna 40 to BS 24. In particular, MS TX 48 comprises a power amplifier (PA) 52, which amplifies the RF uplink signal to the appropriate output power level. Each MS 28 is powered by a power source, such as a battery 68.

BS 24 comprises a BS controller 60, which performs different management functions of the BS. Each MS 28 comprises a MS controller 64, which performs different management functions of the MS. In particular, controllers 60 and 64 carry out the energy-efficient uplink resource allocation methods described herein. Typically, controllers 60 and 64 comprise general-purpose processors, which are programmed in software to carry out the functions described herein. The software may be downloaded to the processors in electronic form, e.g., over a network.

Controllers 60 and 64 may be implemented using software, hardware or a combination of software and hardware elements. The description that follows mainly addresses controller functions that are directly related to uplink resource allocation. Other functions, which may be performed by the BS and MS controllers, are omitted for clarity.

The exemplary system configuration of FIG. 1 is chosen purely for the sake of conceptual clarity. The methods and systems described herein can be used in communication systems and networks having any other suitable configuration. For example, system 20 may comprise multiple base stations interconnected by a suitable core network. Additionally or alternatively, the system may comprise mobile stations, fixed user terminals, or a combination of fixed and mobile stations.

Although the description that follows mainly addresses systems based on the IEEE 802.16e standard cited above, the methods and systems described herein can be used for uplink and/or downlink allocation in any other system or application that allocates time and frequency resources, such as IEEE 802.20 systems or long term evolution (LTE) based on the 3GPP and 3GPP2 standards.

Elements of system 20, and in particular of BS 24 and MS 28, which are not essential to the understanding of the present invention, have been omitted from FIG. 1 for the sake of clarity.

Energy-Efficient Uplink Slot Allocation

As noted above, reducing the energy consumption from battery 68 is often a major design consideration. In many cases, the uplink allocation policy carried out by BS 24 has a significant effect on the energy consumption of the MS transmitter. In particular, allocating a higher number of subcarriers for a shorter time duration provides significant energy saving.

In many cases, some of the circuitry of MS TX 48, such as PA 52 and some of the baseband and RF circuitry, draws constant power from battery 68 regardless of the RF output power of the transmitter. For example, PA 52 often has a certain quiescent power consumption that is independent of the RF output power. Because of this constant overhead, it is preferable from an energy efficiency standpoint to transmit data of a certain size over a larger number of simultaneous subcarriers, while reducing the transmission time.

Figure 2:
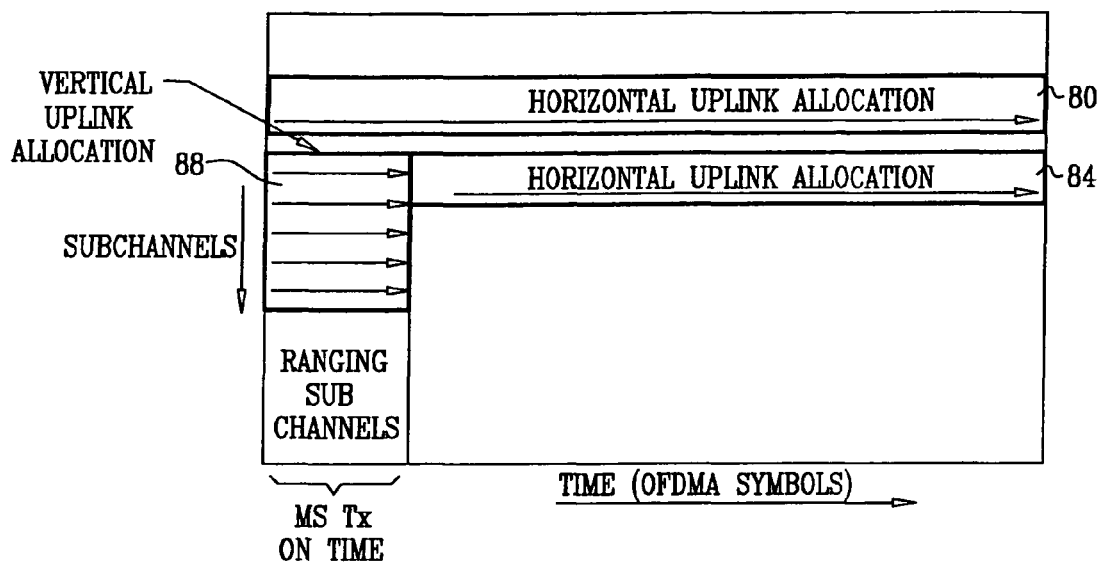
FIG. 2 is a time-frequency diagram that schematically illustrates uplink slot allocations in an OFDMA communication system, in accordance with an embodiment of the present invention.

FIG. 2 is a time-frequency diagram that schematically illustrates uplink slot allocations in system 20, in accordance with an embodiment of the present invention. In the exemplary embodiment of FIG. 2, system 20 comprises an IEEE 802.16e system, in which subcarriers are allocated in groups of twenty-four subcarriers called subchannels. In the present example, the uplink operates in the PUSC mode, in which the basic allocation unit is a slot, which comprises a single subchannel by three OFDMA symbols.

The figure shows a single uplink frame in a time-frequency representation. The horizontal axis shows the OFDMA symbols in the frame along a time axis. The vertical axis shows OFDMA subchannels. Each allocated subchannel is represented by an arrow.

Note that the vertical axis of FIG. 2 denotes logical subchannels and not physical frequency channels. The logical subchannels are typically mapped to respective physical subchannels. Thus, although the time-frequency allocations shown in FIG. 2 comprise adjacent logical subchannels, the corresponding physical subchannels may be distributed over the uplink frequency spectrum in any desired manner, for example in order to improve frequency diversity.

The uplink allocation method specified in the IEEE 802.16e standard attempts to minimize the number of subchannels and increase the time duration of the allocation. The resulting allocations are referred to herein as "horizontal allocations," because of their shape in the time-frequency plane. For example, in FIG. 2, horizontal allocation 80 demonstrates a conventional allocation, in which the number of subchannels is minimized. In the present example, allocation 80 has two subchannels and extends over the entire length of the frame.

Allocation 88 demonstrates an energy-efficient allocation, also referred to as a "vertical allocation," allocated to a MS in accordance with an embodiment of the present invention. In the present example, allocation 88 has five OFDMA subchannels and extends over approximately ⅙ of the frame duration.

In order to enable straightforward integration and backward compatibility with conventional IEEE 802.16e systems, the methods and systems described herein can be implemented using features of the IEEE 802.16e standard, such as data structures and messages. For example, a MS that supports energy-efficient uplink slot allocation can notify the BS of its capability using the capability announcing mechanisms defined in the standard. A new uplink MAP information element (UL-MAP-IE) can be defined, in order to provide vertical allocation information.

In the example of FIG. 2, the resource allocations are performed when the BS operates in the IEEE 802.16e PUSC mode. In PUSC operation, the BS allocates slots to MSs starting from the top left corner of the uplink frame, filling each successive subchannel, and gradually advancing to adjacent subchannels. Vertical slot allocation may disrupt this allocation order, and are therefore protected by the BS from being run-over by other, conventional allocations.

For example, assigning an Uplink Interval Usage Code (UIUC) value of 13 to a certain region of the uplink frame blocks the region from being allocated, usually to avoid interference to and from neighboring base stations. In some embodiments, the UIUC=13 assignment can be put to a different use. The BS may assign a UIUC=13 value to a vertical allocation in order to protect it from being run-over by horizontal slots.

In the example of FIG. 2, the BS first allocated horizontal allocation 80, and then allocated vertical allocation 88. In order to protect allocation 88 from being run-over by subsequent allocations, the BS defines the region occupied by this allocation as having UIUC=13.

Subsequently, the BS allocates an additional horizontal allocation 84, having a single subchannel and extends over approximately ⅚ of the frame. As can be seen, allocation 84 begins at the top left of the remaining, unallocated area of the frame. Allocation 84 does not run over vertical allocation 88, since the latter is protected by the UIUC=13 assignment.

Although the example above refers to PUSC operation, vertical allocations can also be performed using the methods described herein when the BS operates in the IEEE 802.16e Optional PUSC mode, Adaptive Modulation and Coding (AMC) mode, Adaptive Antenna System (AAS) mode, Hybrid Automatic Repeat Request (HARQ) mode and Space-Time Coding (STC) mode. Any suitable mechanism can be used in these modes to protect vertical allocations from being run-over by subsequent allocations.

The energy saving achieved by the vertical allocations can be appreciated by comparing horizontal allocation 80 with vertical allocation 88. Allocations 80 and 88 contain the same amount of data. In allocation 88, however, the MS transmitter is on for only ⅕ of the frame, whereas in allocation 80 the MS transmitter has to be on for the entire frame duration—five times longer than in allocation 88.

Thus, the energy consumed from battery 68 when using vertical allocation 88 is significantly lower than the energy consumed when using horizontal allocation 80. For example, in a typical OFDMA transmitter, transmitting a single subchannel (i.e., horizontal allocation) at an output power of 14 dBm draws approximately 280 mA from the battery. This current consumption includes the current drawn by the power amplifier and other RF and baseband circuitry. Transmitting the same amount of data using a vertical allocation of five simultaneous subchannels would require an output power of 21 dBm, which draws approximately 400 mA. However, in the vertical allocation, 400 mA are drawn for only 20% of the duration of the horizontal allocation. Thus, the vertical allocation is more energy-efficient than the comparable horizontal allocation by a factor of 280/(400×0.2)=3.5.

Slot Allocation Method Description

Figure 3:
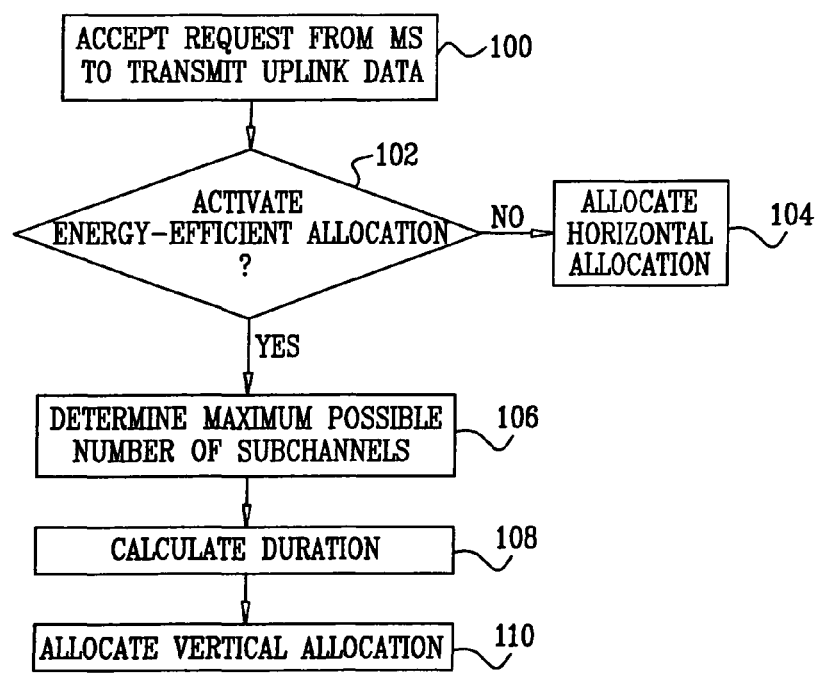
FIG. 3 is a flow chart that schematically illustrates a method for uplink slot allocation, in accordance with an embodiment of the present invention.

FIG. 3 is a flow chart that schematically illustrates a method for uplink slot allocation, in accordance with an embodiment of the present invention. The method begins with BS 24 accepting a request from MS 28 to transmit uplink data, at an uplink request step 100. The request typically comprises an indication of the size of the data pending for transmission.

BS controller 60 determines whether or not to use an energy-efficient uplink allocation when allocating time-frequency slots to the requesting MS, at an activation checking step 102. The BS controller can use any suitable criterion or policy for deciding whether to use energy-efficient allocation for a particular MS request.

In some embodiments, the BS controller considers the output power level at which the MS is expected to transmit and the remaining headroom from the expected power to its maximum available power. For example, the BS controller may check whether the link budget between the MS and the BS allows the MS to split its output power among multiple subchannels, so that each subchannel can still be received successfully at the BS receiver. Alternatively, the BS controller may check whether the MS power headroom is sufficiently-high to allow the MS to increase its total transmit power without reaching its power limit.

The BS controller may compare the expected power level or the headroom to a threshold and choose to allocate an energy-efficient slot if the threshold is not exceeded. For example, if the MS headroom is 9 dB, and the MS requested to transmit ten slots, the BS controller can allocate 5 subchannels for a duration of two slots. The transmit power of the MS will increase by a factor of five (7 dB) with respect to a conventional horizontal allocation, which allocates a single subchannel for ten slot durations.

Additionally or alternatively, the BS controller may consider characteristics of the communication channel between the BS and the MS, such as the delay spread, Doppler spread and/or the signal to interference ratio (SINR) of the channel. Some of these characteristics may relate to the mobility of the MS with respect to the BS. For example, when communicating with a MS having a high delay-spread (i.e., low coherence bandwidth), it is may be more difficult to receive wideband signals for certain receiver algorithm implementations. Thus, the BS controller may evaluate the channel characteristics and decide to use energy-efficient allocation if the characteristics are within a certain range.

In some embodiments, the BS controller may take into account constraints related to other allocations, allocated to other MS in the uplink frame. For example, the BS controller may consider the slots that are still available for allocation, in view of previously-allocated slots.

The BS controller may use any of the criteria described above, a combination of such criteria, and/or any other suitable criterion, constraint or policy, for determining whether or not to use energy-efficient slot allocation.

If the BS controller decides not to use energy-efficient slot allocation, it allocates a horizontal allocation having a small number of subchannels, at a horizontal allocation step 104. The BS controller may use any suitable allocation scheme for this purpose, such as the allocation schemes described in the IEEE 802.16e standard, cited above.

If, on the other hand, the BS controller decides to use energy-efficient slot allocation, it evaluates the maximum number of subchannels that may participate in such an allocation, at a maximum subchannels evaluation step 106.

Typically, the BS controller considers the average output power at which the MS intends to transmit, and compares it to the maximum power rating of the MS. In some embodiments, the BS may determine the maximum power rating of the MS by using the UL-HEADROOM information transmitted by the MS. As noted above, a transmitted signal that contains a large number of subchannels has a higher output power. Thus, in order to transmit a large number of subchannels, the output power of PA 52 should be sufficiently lower than the maximum power rating of the PA, to accommodate the linearity requirements of the transmitted signal.

The output power of the transmitted signal increases monotonically with the number of subchannels. Thus, the BS controller may determine the maximum possible number of subchannels based on the PA headroom (i.e., the ratio between the maximum power rating of the PA and the output power it intends to transmit). For example, the BS controller may hold a look-up table indicating the maximum number of subcarriers for different headroom values. Alternatively, the BS controller may evaluate a predefined function that provides the maximum number of subcarriers as a function of the headroom value.

The total output power of PA 52 is divided among the subchannels. Thus, the BS controller may also verify that the number of subchannels is selected, such that the power of each individual subchannel is sufficient for successful reception at the BS receiver. For example, assume that the BS decided to allocate ten subchannels to a particular MS, but the remaining headroom at the MS is only 9 dB. Obviously, the MS cannot increase its power by a factor of ten (i.e. by 10 dB). Transmitting over ten subchannels in this case will decrease the available power per subchannel by 1 dB, which may be acceptable under certain SINR conditions.

The BS controller calculates the time duration of the uplink allocation, at a duration calculation step 108. The size of the data requested for transmission is known to the BS controller. After determining the number of subchannels, the BS controller can calculate the number of OFDMA symbols, or the number of slots, needed for transmitting the requested data size over the selected number of subchannels.

Having determined the number of subchannels and the time duration of the uplink allocation, the BS controller allocates the appropriate slots to the requesting MS. The MS then transmits the data over the allocated slots.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
accepting a request from a transmitter to transmit data to a receiver in a multiple-access communication system that uses multiple subcarriers;
calculating a highest number of the subcarriers, that will together not exceed a predetermined signal power capability of the transmitter when the subcarriers are used by the transmitter simultaneously for transmitting the data;
allocating to the transmitter a time-frequency allocation containing the calculated highest number of the subcarriers; and
transmitting the data from the transmitter to the receiver using the allocated time-frequency allocation.

2. The method according to claim 1, wherein the communication system comprises an orthogonal frequency division multiple access (OFDMA) system.

3. The method according to claim 2, wherein the communication system conforms to an IEEE 802.16e standard, wherein the transmitter comprises a mobile station (MS) and wherein the receiver comprises a base station (BS).

4. The method according to claim 3, wherein allocating the time-frequency allocation comprises allocating the time-frequency allocation when the BS and MS operate in at least one uplink mode selected from a group of modes consisting of a Partially-Used Sub-Channeling (PUSC) mode, an Optional PUSC mode, an Adaptive Modulation and Coding (AMC) mode, an Adaptive Antenna System (AAS) mode, a Hybrid Automatic Repeat Request (HARQ) mode and a Space-Time Coding (STC) mode.

5. The method according to claim 1, wherein accepting the request comprises accepting a request to transmit a predetermined volume of the data, and wherein allocating the time-frequency allocation comprises determining a time duration of the allocation responsively to the volume of the data and to the highest number of the subcarriers.

6. The method according to claim 1, and comprising determining whether to allocate the time-frequency allocation containing the highest number of the subcarriers based on a predetermined policy.

7. The method according to claim 6, wherein the predetermined policy is based on at least one parameter selected from a group of parameters consisting of:
an expected transmission power of the transmitter;
a headroom between the expected transmission power and a maximum power of the transmitter;
a mobility of the transmitter;
a characteristic of the communication channel between the transmitter and the receiver; and
another time-frequency allocation to another transmitter.

8. The method according to claim 1, wherein calculating the highest number of the subcarriers comprises maximizing the number of the subcarriers in the allocation while not exceeding a maximum power rating of the transmitter.

9. The method according to claim 1, wherein allocating the time-frequency allocation comprises protecting the allocation from other allocations.

10. The method according to claim 9, wherein the communication system conforms to an IEEE 802.16e standard, and wherein protecting the allocation comprises assigning an Uplink Interval Usage Code value of thirteen (UIUC=13) to the allocation.

11. The method according to claim 1, wherein the communication system comprises a Long-Term Evolution (LTE) system.

12. A base station in a multiple access communication system that uses multiple subcarriers, comprising:
a receiver, which is arranged to accept a request to transmit data from a user terminal of the communication system; and
a processor, which is arranged to calculate a highest number of the subcarriers, that will together not exceed a predetermined signal power capability of the user terminal when the subcarriers are used by the user terminal simultaneously for transmitting the data, and to allocate a time-frequency allocation containing the calculated highest number of the subcarriers to the user terminal, so as to enable the user terminal to transmit the data in the allocated time-frequency allocation.

13. The base station according to claim 12, wherein the communication system comprises an orthogonal frequency division multiple access (OFDMA) system.

14. The base station according to claim 13, wherein the communication system conforms to an IEEE 802.16e standard.

15. The base station according to claim 14, wherein the processor is arranged to allocate the time-frequency allocation when the base station operates in at least one uplink mode selected from a group of modes consisting of a Partially-Used Sub-Channeling (PUSC) mode, an Optional PUSC mode, an Adaptive Modulation and Coding (AMC) mode, an Adaptive Antenna System (AAS) mode, a Hybrid Automatic Repeat Request (HARQ) mode and a Space-Time Coding (STC) mode.

16. The base station according to claim 12, wherein the request defines a predetermined volume of the data to be transmitted, and wherein the processor is arranged to determine a time duration of the time-frequency allocation responsively to the volume of the data and to the highest number of the subcarriers.

17. The base station according to claim 12, wherein the processor is arranged to determine whether to allocate the time-frequency allocation containing the highest number of the subcarriers based on a predetermined policy.

18. The base station according to claim 17, wherein the predetermined policy is based on at least one parameter selected from a group of parameters consisting of:
an expected transmission power of the user terminal;
a headroom between the expected transmission power and a maximum power of the user terminal;
a mobility of the user terminal;
a characteristic of the communication channel between the user terminal and the base station; and
allocations to other user terminals.

19. The base station according to claim 12, wherein the processor is arranged to maximize the number of the subcarriers in the allocation while not exceeding a maximum power rating of a power amplifier of the user terminal.

20. The base station according to claim 12, wherein the processor is arranged to protect the allocation from other allocations.

21. The base station according to claim 20, wherein the communication system conforms to an IEEE 802.16e standard, and wherein the processor is arranged to protect the allocation by assigning an Uplink Interval Usage Code value of thirteen (UIUC=13) to the allocation.

22. The base station according to claim 12, wherein the communication system comprises a Long-Term Evolution (LTE) system.

23. A computer software product for communication in a base station of a multiple access communication system that uses multiple subcarriers, the product comprising a computer-readable medium, in which program instructions are stored, which instructions, when read by a computer, cause the computer to accept a request to transmit data from a user terminal of the communication system, to calculate a highest number of the subcarriers, that will together not exceed a predetermined signal power capability of the user terminal when the subcarriers are used by the user terminal simultaneously for transmitting the data, and to allocate a time-frequency allocation containing the calculated highest number of the subcarriers to the user terminal, so as to enable the user terminal to transmit the data in the allocated time-frequency allocation.

24. A multiple access communication system that uses multiple subcarriers, comprising:

a transmitter, which is arranged to submit a request to transmit data and to transmit the data in a time-frequency allocation allocated to the transmitter responsively to the request; and a receiver, which is arranged to accept the request, to calculate a highest number of the subcarriers, that will together not exceed a predetermined signal power capability of the transmitter when the subcarriers are used by the transmitter simultaneously for transmitting the data, and to allocate the time-frequency allocation containing the highest number of the subcarriers to the transmitter.

* * * * *